(12) United States Patent
Yan et al.

(10) Patent No.: US 12,247,832 B2
(45) Date of Patent: Mar. 11, 2025

(54) METHOD OF ESTIMATING TARGET HEIGHT BY DETECTION DEVICE

(71) Applicant: Aptiv Technologies AG, Schaffhausen (CH)

(72) Inventors: Honghui Yan, Wuppertal (DE); Alexander Ioffe, Bonn (DE); Jens Westerhoff, Bochum (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 476 days.

(21) Appl. No.: 17/658,490

(22) Filed: Apr. 8, 2022

(65) Prior Publication Data

US 2022/0326009 A1  Oct. 13, 2022

(30) Foreign Application Priority Data

Apr. 13, 2021 (EP) ..................... 21168126

(51) Int. Cl.
*G01B 15/02* (2006.01)
*G01S 13/931* (2020.01)

(52) U.S. Cl.
CPC ............ *G01B 15/02* (2013.01); *G01S 13/931* (2013.01)

(58) Field of Classification Search
CPC ..... G01B 15/02; G01S 13/882; G01S 13/931; G01S 7/02; G01S 13/42; G01S 13/46; G01S 2013/462
See application file for complete search history.

(56) References Cited

U.S. PATENT DOCUMENTS

| | | | |
|---|---|---|---|
| 5,278,564 A | * | 1/1994 | Groenenboom .... G01S 13/4418 342/123 |
| 6,266,005 B1 | * | 7/2001 | Schneider ............... G01S 13/46 342/25 R |
| 9,046,607 B2 | * | 6/2015 | Ohkado .................. G01S 13/42 |
| 9,575,170 B2 | * | 2/2017 | Kurono .................... G01S 13/42 |
| 11,454,705 B2 | * | 9/2022 | Mardani ................. G01S 7/415 |

(Continued)

FOREIGN PATENT DOCUMENTS

| | | |
|---|---|---|
| DE | 19801617 | 7/1999 |
| DE | 102010007415 | 9/2010 |
| WO | 2007131923 | 11/2007 |

OTHER PUBLICATIONS

"Extended European Search Report", EP Application No. 21168126.7, Oct. 7, 2021, 7 pages.

*Primary Examiner* — Peter M Bythrow
(74) *Attorney, Agent, or Firm* — Harness, Dickey & Pierce, P.L.C.

(57) ABSTRACT

A method is disclosed, which is carried out by a detection device having a transmitter element for transmitting wave signals and two vertically aligned receiver elements for receiving wave signals, separated by a given spacing. The method includes transmitting, at the transmitter element, a wave signal that is reflected by the target. Each receiver element receives the wave signal reflected by the target, where the wave signal propagates via multiple paths caused by the reflecting surface. While a target distance varies, a phase difference between the reflected wave signals received by the two receiver elements is measured. From the phase difference measurements, a physical quantity fluctuation is determined in relation to the target distance. The information on the target height is then derived from the physical quantity fluctuation.

20 Claims, 2 Drawing Sheets

(56) References Cited

U.S. PATENT DOCUMENTS

| | | | |
|---|---|---|---|
| 2007/0273576 A1* | 11/2007 | Struckman | G01S 3/146 342/146 |
| 2009/0315755 A1* | 12/2009 | Cornic | G01S 13/913 342/38 |
| 2010/0271254 A1* | 10/2010 | Kanamoto | G01S 13/931 342/146 |
| 2011/0221628 A1* | 9/2011 | Kamo | G01S 7/295 342/123 |
| 2012/0119937 A1* | 5/2012 | Yamada | G01S 7/4021 342/70 |
| 2014/0062762 A1* | 3/2014 | Kurono | G01S 7/354 342/146 |
| 2017/0029107 A1* | 2/2017 | Emami | G01S 13/003 |
| 2019/0391230 A1* | 12/2019 | Loesch | G01S 13/42 |
| 2020/0225337 A1* | 7/2020 | Kishigami | G01S 7/41 |
| 2022/0099818 A1* | 3/2022 | Werner | G01S 5/0252 |

\* cited by examiner

METHOD OF ESTIMATING TARGET HEIGHT BY DETECTION DEVICE

CROSS-REFERENCE TO RELATED APPLICATION(S)

This application claims priority to European Patent Application Number 21168126.7, filed Apr. 13, 2021, the disclosure of which is hereby incorporated by reference in its entirety herein.

BACKGROUND

In the automotive field, radar devices are used for providing reliable and accurate information on the driving environment to advanced driver assistance systems, even in bad weather and poor lighting conditions. They are considered as a key technology for automotive safety systems and highly automated driving systems. Radar devices can provide measurements of a target distance (in other words: distance between the radar device and a target), and relative velocity of a target.

The road surface is a good reflecting surface for radar waves. As a result, there are two propagation paths between the radar device and the target in each of the two propagation directions: a direct propagation path and an indirect propagation path via the road surface. The two propagations paths are taken by the radar waves transmitted from the radar device to the target and by the radar waves reflected by the target towards the radar device. Due to the reflection on the road surface, it is as if the radar device sees two targets: the real target and an artificial target corresponding to the mirror image of the target below the road surface. It is known that the two targets, real and artificial, cause an interference phenomenon which results in peaks and valleys in a course of and intensity modulation of the reflected radar signals, received by the radar device, over a range of the target distance. In other words, when the distance between the radar device and the target varies, the intensity of the reflected radar signals received by the radar device varies and shows peaks and valleys at specific target distances due to the interference phenomenon.

U.S. Pat. No. 6,266,005 B1 discloses "a radar signal processing method for estimating the height of an object above a reflecting surface, for which: a change over time in the distance between object and radar device is determined and an intensity modulation of the received signal is measured. Thereafter, information on the object height above the reflecting surface is derived from the course of the intensity modulation over the object distance."

A drawback of such an approach, which estimates the height of the target based on measurements of the intensity of the received radar signal reflected by the target, is that it is dependent on the target reflectivity. Indeed, the reflectivity of the target depends on the target material and influences the measured intensity of the received radar signal. This may degrade the estimation of the target height.

Therefore, there is a need for estimating the height of a target above a reflecting surface more robustly.

SUMMARY

The present disclosure relates to a method of estimating a height of a target by processing wave signals transmitted from a detection device to a target and reflected by the target, in a context of a multipath propagation of the waves through the reflection by a reflecting surface. Such a method can be used for example in a vehicle having a radar device to estimate the height of a target object above the road surface.

The present disclosure concerns a method of determining an information on a height of a target above a reflecting surface, carried out by a detection device having a transmitter element for transmitting wave signals and two vertically aligned receiver elements for receiving wave signals, separated by a given spacing (d), including the steps of: at the transmitter element, transmitting a wave signal that is reflected by the target; at each receiver element, receiving the wave signal reflected by the target, the wave signal propagating via multiple paths caused by the reflecting surface; while a target distance between the detection device and the target varies, measuring (S3) a phase difference ($\Delta\phi$) between the reflected wave signals received by the two receiver elements; determining, from the phase difference measurements, a physical quantity fluctuation in relation to the target distance; deriving the information on the height of the target from the physical quantity fluctuation.

In the present disclosure, the information on the target height is derived from the phase difference measured between the two receiver elements. Thus, the estimation of the target height is based on a difference approach. It allows the estimation to be more robust because unwanted dependencies affecting the two channels, through the two receiver elements, are cancelled out. For example, the method is less dependent on the target reflectivity.

As the physical quantity fluctuation is derived from phase difference measurements, this allows to obtain sharper valleys, that are much easier to detect. In addition, the regions of the curve representing the physical quantity fluctuation in relation to the target distance where no valley occurs are almost flat. As a result, it is easier and more robust to detect valleys than in conventional techniques using modulation of the intensity of the reflected radar signal.

In some embodiments, an estimated elevation angle fluctuation in relation to the target distance, an elevation angle being formed between a horizontal plane including the detection device and a line going from said detection device to the target, is determined from the phase difference measurements and according to a calculation relationship between the phase difference and the spacing between the receiver elements.

Advantageously, the method further includes a valley search step of searching at least one valley in the physical quantity fluctuation, and wherein the information on the height of the target is determined (derived) from a result of said valley search.

In a particular embodiment, when no valley is found in the physical quantity fluctuation while the target distance decreases, it is determined that the height of the target is less than one or more predetermined reference heights.

In case that a first valley is detected in the physical quantity fluctuation when the target distance decreases from a long-range target distance, the height of the target can be calculated from a target distance of the first valley according to a calculation relationship between the target distance of the first valley and the height of the target.

In case that a second valley is detected in the physical quantity fluctuation when the target distance continues decreasing, the height of the target can be calculated again from the target distance of the second valley according to a calculation relationship between the target distance of the second valley and the height of the target, and the two calculated heights of the target can be compared in order to check that they are consistent.

In some embodiments, the method includes the steps of detecting a plurality of valleys in the physical quantity fluctuation and estimating the height of the target from respective target distances of the plurality of detected valleys.

The detected valleys can be compared with a plurality of prestored models of the physical quantity fluctuation, each model corresponding to a given target height, and the model that best matches the plurality of detected valleys is selected to estimate the height of the target.

Alternatively, at least one of the target distances of the detected valleys and the physical quantity fluctuation in relation to the target distance can be transmitted to a machine learning module, as input data, and the machine learning module outputs the height of the target.

The present disclosure further concerns a detection device having a transmitter element for transmitting wave signals, two vertically aligned receiver elements for receiving wave signals, separated by a given spacing, and a processor for controlling the execution of the steps of the method previously defined.

The present disclosure also concerns: a computer program including instructions to cause the detection device above defined to execute the steps of the method previously defined; and a computer-readable medium having stored thereon the above defined computer program.

The present disclosure also concerns a vehicle including the detection device previously defined.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

The present disclosure concerns the estimation of a height of a target 2 above a reflecting surface 3 by a detection device 1 that transmits waves to the target 2 and, in return, receives waves reflected by the target 2. The target 2 can be any object or element above the reflecting surface 3 (for example a ground surface).

The detection device 1 has a transmitter element 10 for transmitting waves and two vertically aligned receiver elements 11A, 11B receiving waves. The two receiver elements 11A, 11B are separated by a given spacing d. The detection device 1 may have more than two vertically aligned receiver elements 11A, 11B for receiving waves and/or more than one transmitter element 10 for transmitting the waves. In some embodiments, the detection device 1 may have transmitter-receiver elements that each transmit and receive waves.

Figure 1:
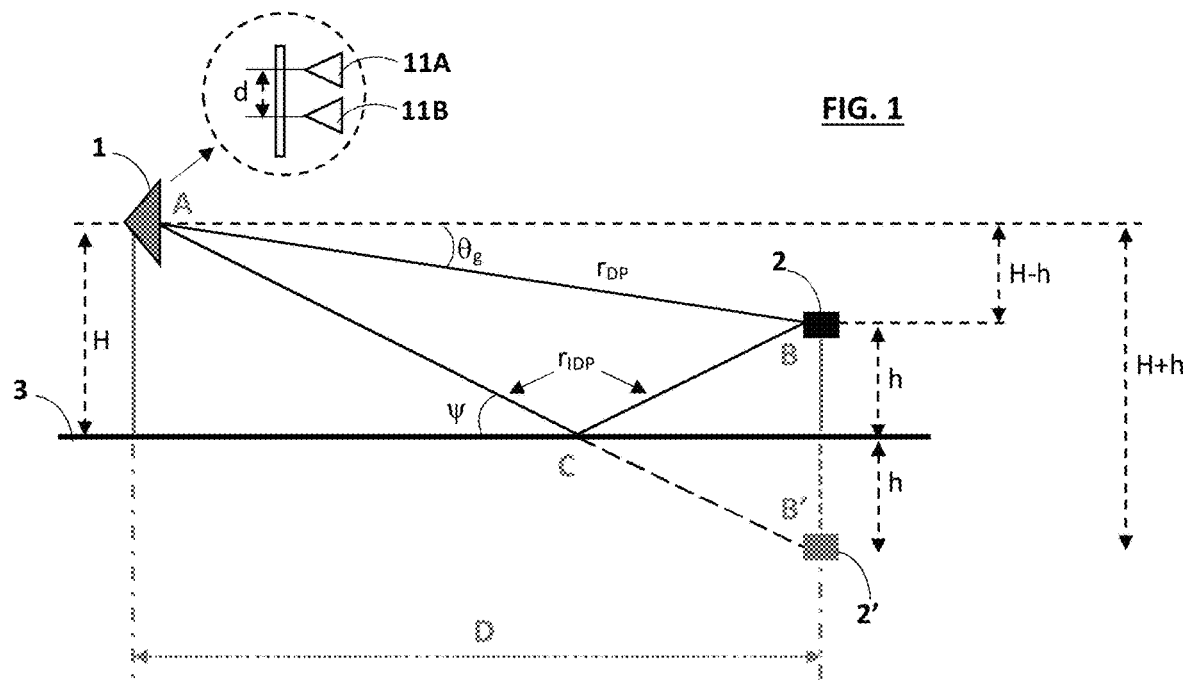
FIG. 1 shows a system including a detection device, a target and the paths taken by waves transmitted by the detection device to the target and reflected by the target.

As shown in FIG. 1, there are two propagation paths between each receiver element 11A, 11B (point A) and the target 2 (point B): a direct propagation path $r_{DP}$ and an indirect propagation path $r_{IDP}$ via the reflecting surface 3 (point C). The two propagations paths $r_{DP}$ and $r_{IDP}$ are taken by the waves in the two directions: from the detection device 1 to the target 2 and from the target 2 to the detection device 1. For the detection device 1, it is as if it sees two targets: the real target 2 (in point B) above the reflecting surface 3 and an artificial target 2' (in point B') corresponding to the mirror image of the target 2 below the reflecting surface 3. The two targets 2, 2', real and artificial, cause an interference phenomenon. The detection device 1 makes use of the interference phenomenon to determine an information on the height of the target 2, as explained later.

In operation, the transmitter element 10 transmits waves that are reflected by the target 2 and, in return, each of the two receiver elements 11A, 11B receives waves reflected by the target 2. The waves propagate via multiple paths through the reflection by the reflecting surface 3. After transmission of waves to the target 2, each of the two receiver elements 11A, 11B receives in return a wave signal reflected by the target 2. Each received wave signal has an amplitude and a phase information. The detection device 1 measures continuously, in real time, a phase difference $\Delta\phi$ between the two wave signals respectively received by the two receiver elements 11A, 11B. When the target distance D between the detection device 1 and the target 2 varies, the detection device 1 measures the phase difference $\Delta\phi$ between the two wave signals respectively received by the two receiver elements 11A, 11B. As shown in FIG. 1, the target distance D can be the distance between the detection device 1 and the target 2 related to the reflecting surface 3. When the reflecting surface is a road surface, the target distance D is the ground distance (also termed as the "ground range" or the "range").

Then, the detection device 1 determines a physical quantity fluctuation in relation to the target distance D (range) from the phase difference measurements. The fluctuation of a physical quantity as a function depending on the target distance (in other words: the physical quantity as it varies with the target distance) can be determined. The physical quantity can be the phase difference or be derived from the phase difference. Then, an information on the height of the target 2 is derived from the determined physical quantity fluctuation over the target distance. For example, a valley search in the physical quantity fluctuation is performed. In other words, one or more valleys are searched in the determined physical quantity fluctuation. A valley corresponds to a local minimum point in the physical quantity fluctuation. The physical quantity fluctuation is considered to have a local (or relative) minimum point (valley) at a point $x_m$ of the target distance range (in other words: at a specific target distance) if there is some $\varepsilon>0$ such that the physical quantity for all x within distance $\varepsilon$ of $x_m$ is equal or more than the physical quantity for the point $x_m$. the value of $\varepsilon$ is selected appropriately to detect the minimum points. Such a valley is caused by the interference phenomenon.

An information on the height of the target 2 is determined (in other words: derived) from a result of the valley search, as will be explained in more detail later.

Figure 3:
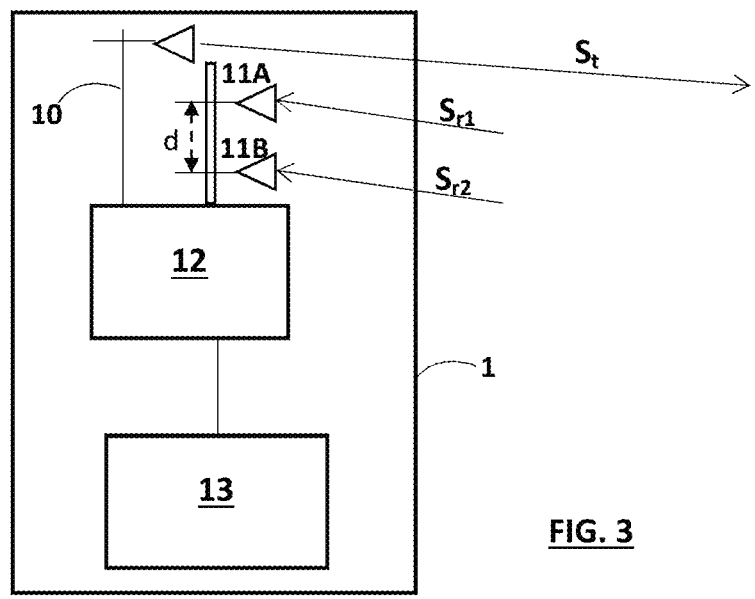
FIG. 3 shows a functional block diagram of the detection device, according to a particular embodiment.

As shown in FIG. 3, the detection device 1 further has a transceiver block 12, to which a transmitter element 10 and the two receiver elements 11A, 11B are connected, and a processor 13 (in other words: a control processing unit).

The transceiver block 12 controls the transmission of waves and processes the waves received in return to extract an amplitude and phase information.

The processor 13 controls the operation of the detection device 1 and performs wave signal processing to estimate a height of a target. More precisely, the processor 13 controls the execution of the steps of the method for determining an information on the height of a target 2, described below.

The transceiver block 12 and the processor 13 can be fused in one control processing unit.

In a first embodiment, the detection device 1 is a radar device. The radar device can be mounted on a vehicle. In that case, the reflecting surface 3 is typically a road surface.

In the radar device 1, the two receiver elements 11A, 11B, that are two receiver antenna elements for receiving radar waves (in other words: radar signals) and the transmitter element 10 is a transmitter antenna element for transmitting radar waves (radar signals)

Figure 4:
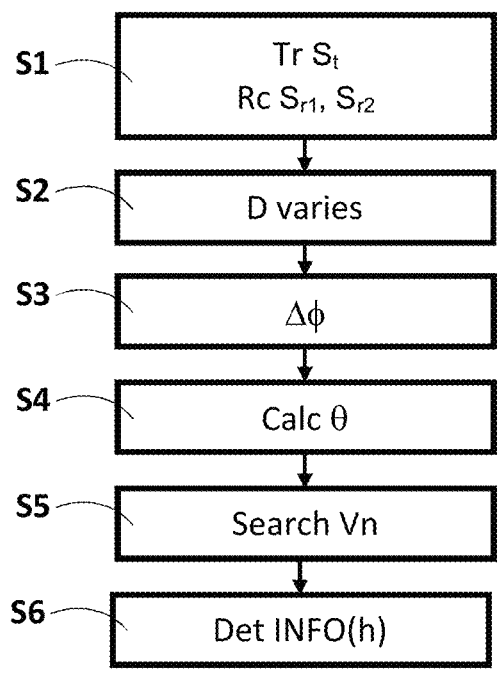
FIG. 4 shows a flowchart of the method of estimating a height of the target, according to a first embodiment.

The method of determining an information on the height of the target, carried out by the radar device 1, according to a first embodiment, will now be described with reference to FIG. 4.

In a first step S1, the transmitter antenna element 10 transmits a radar wave signal $S_t$ to the target 2. In return, the receiver antenna elements 11A, 11B receive two radar wave signals $S_{r1}$, $S_{r2}$ reflected by the target 2. As previously explained, the waves (in other words: the wave signal) propagate via multiple paths due to the reflection by the reflecting surface 3 and an interference phenomenon occurs.

In a step S2, it is determined that the target distance D, also currently termed as the range, that is the distance between the radar device 1 and the target 2 varies over time. For example, the target distance D decreases while the radar device 1 approaches the target 2.

In a step S3, while the target distance (range) D varies, the wave signal $S_{r1}$, $S_{r2}$ received by each receiver antenna element 11A, 11B is processed by the transceiver block 12 to determine a phase information of each wave signal $S_{r1}$, $S_{r2}$ and measure a phase difference $\Delta\phi$ between the two wave signals $S_{r1}$, $S_{r2}$ respectively received by the two receiver antenna elements 11A, 11B.

In a step S4, a fluctuation of an estimate of the elevation angle over the target distance D (within the interval of target distance or range covered by the variation of the target distance) is determined from the phase difference $\Delta\phi$ measurements according to a calculation relationship between the phase difference $\Delta\phi$ and the spacing d between the receiver antenna elements 11A, 11B. The calculation relationship is expressed below:

$$\Delta\phi = \left(\frac{2\pi}{\lambda}\right) d \sin(\theta) \quad (1)$$

where $\Delta\phi$ is the phase difference between the radar wave signals $S_{r1}$, $S_{r2}$ respectively received by the two vertically aligned receiver antenna elements 11A, 11B; $\theta$ is an estimate of the elevation angle $\theta_g$; $\lambda$ is the wavelength of the radar waves; and d is the spacing (distance) between the two receiver antenna elements 11A, 11B.

As an illustrative and non-limitative example, the vertical spacing d between the two receiver antenna elements 11A, 11B is equal to the wavelength $\lambda$ multiplied by a given factor k. In other words: $d=k\lambda$. In an illustrative and non-limitative example, $k=2$ and therefore $d=2\lambda$. In such an example, the expression (1) can be simplified as follows:

$$\Delta\phi = 4\pi \sin(\theta) \quad (1')$$

Figure 2:
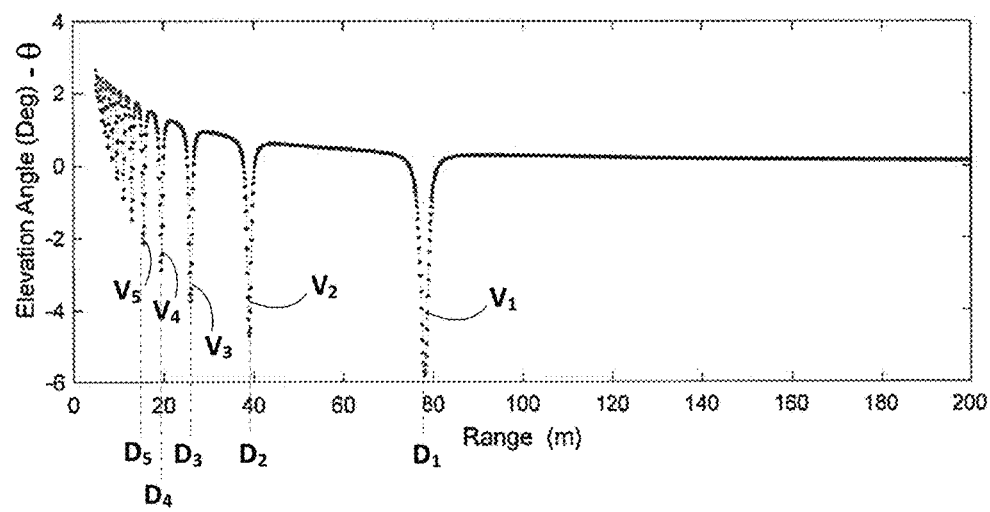
FIG. 2 shows an example of a fluctuation of an estimate of an elevation angle (disturbed) of the target depending on a target distance.

A geometrical elevation angle $\theta_g$ is formed between a horizontal plane including the detection device 1 (in other words: extending through the detection device 1, as shown in FIG. 1) and a line going from the detection device 1 to the target 2 (or to the top of the target) as shown in FIG. 1. The geometrical angle of elevation $\theta_g$ of a target 2 is considered the same for the two receiver antenna elements 11A, 11B, as the distance d between the receiver antenna elements 11A, 11B is very small (negligible) compared to the target distance D. The estimated elevation angle $\theta$ that is derived from a measurement of the phase difference is an estimate of the geometrical elevation angle $\theta_g$ shown in FIG. 1. The estimated elevation angle $\theta$ is disturbed by the interference due to the indirect path of the radar waves, as shown in FIG. 2. The estimated elevation angle $\theta$ (derived from the measurement of the phase difference between the receiving antennas) shows the disturbances due to the interference phenomenon in the form of valleys.

For example, the detection device 1 determines the fluctuation (in other words: the course, the evolution) of the estimated angle of elevation $\theta$ of the target 2 over time (in other words: as it varies with time) from the phase difference measurements, based on the expression (1). Then, the detection device 1 derives the fluctuation of the estimated elevation angle $\theta$ over the target distance (in other words: as it varies with the target distance) from the fluctuation of the elevation angle $\theta$ over time, based on the knowledge of the variation of the target distance over time.

FIG. 2 shows an example of the fluctuation of the estimated (disturbed) elevation angle $\theta$ over the target distance in the distance range between 0 and 200 m. For example, when the vehicle having the radar device 1 approaches the target 2, the distance range is traveled from 200 m to 0m (i.e., from the right to the left of the diagram in FIG. 2). The fluctuation of the estimated elevation angle $\theta$ over the target distance (in other words: the variation or course of the elevation angle $\theta$ depending on the target distance) within the variation range of the target distance D has a plurality of valleys (in other words: a plurality of local minimum points) $V_1$, $V_2$, $V_3$, . . . , due to the interference phenomenon. The successive valleys $V_1$, $V_2$, $V_3$, . . . have respective theorical positions $D_1$, $D_2$, $D_3$, . . . within the interval of target distances (ranges). In other words, each valley $V_n$ is characterized by a specific target distance $D_n$ and has an order index n in the succession of valleys $V_1$, $V_2$, $V_3$, . . . . The first valley $V_1$ is characterized by the highest target distance $D_1$. For each valley $V_n$, there is a theorical relationship between the order index n of the valley $V_n$, the target distance $D_n$ of the valley $V_n$ and the height h of the target 2. A simplified version of the theorical relationship between the order index n of the valley $V_n$, the target distance $D_n$ of the valley $V_n$ and the height h of the target 2 can be expressed below:

$$h = \frac{n\lambda D_n}{2H} \quad (2)$$

where h is the height of the target; n is the valley index (or order index), the first index $n=1$ corresponding to the first valley observed when the target distance decreases from a long range (in other words: far) distance (for example, the first valley is the valley furthest to the right in FIG. 2); $D_n$ is the target distance of the valley (in other words: the position of the valley within the interval of target distance); $\lambda$ is the wavelength of the radar waves; and H is the height of the radar device 1 over the reflecting surface 3.

The simplified relationship (2) can be used as a calculation relationship, or calculation rule, to calculate an estimation of the height of the target 2, as explained later.

The fluctuation of the estimated elevation angle θ over the target distance D (range) is used by the detection device 1 to perform a valley search that consists in searching at least one valley $V_n$ in the elevation angle θ fluctuation, in a step S5.

In a step S6, an information on the height of the target is determined (derived) from a result of the valley search S5.

The steps S4, S5 and S6 can be carried out in real time while the target distance is varying, in order to determine information on the height of the target in real time, for example as the vehicle with the detection device 1 is approaching the target 2.

Different embodiments can be implemented for determining an information on the height of the target 2 from the fluctuation of the estimated elevation angle θ over the target distance, in the steps S5 and S6. Some embodiments can be used by the radar device 1 cumulatively.

In the first embodiment, the detection device 1 is a long-range detection device 1. The detection range of the detection device 1 covers long target distances (ranges) of 80 m to 200 m or greater depending on the range detection of the detection device 1. For example, the detection device 1 is a long-range radar. Such a long-range radar can detect far objects (targets) and provide target distances of 80 m to 200 m or greater.

In the first embodiment, long-range data of measurement is obtained by the radar device 1. In that case, when the target distance D decreases (for example because the vehicle is approaching the target 2), a first valley $V_1$ at a range position $D_1$ can be detected, in the search step S5.

In the step S6, the height of the target 2 is estimated by calculation with the expression (2) and the values n=1 and $D_n=D_1$. The detection of the first valley $V_1$ allows to precisely estimate the height of the target 2.

Optionally, in the search step S5, the second valley $V_2$ at a range position $D_2$ is then detected and, in the step S6, the height of the target 2 is estimated again by calculation with the expression (2) and the values n=2 and $D_n=D_2$.

Then, the first estimation and the second estimation of the target height can be checked for consistency. They are considered as mutually confirmed if the two estimations are identical or substantially identical. A difference between the two estimations equal or less than a predetermined maximum percentage (for example, a percentage between 5% and 20%) can be tolerated.

In a second embodiment, the detection device 1 is also a long-range detection device. In that case, if no valley is found in the estimated elevation angle θ fluctuation at given reference target distances (ranges) $D_{ref1}$, $D_{ref2}$, . . . , as the target distance decreases from long-range distances (i.e., from 200 m to 80 m or greater), in the step S5, it is estimated that the height of the target 2 is less than one or more corresponding reference heights $h_{ref1}$, $h_{ref2}$, . . . , in the step S6. The relationship between the reference target distances (ranges) $D_{ref1}$, $D_{ref2}$, . . . , and the corresponding reference heights $h_{ref1}$, $h_{ref2}$, . . . is given by the expression (2) for n=1, as follows:

$$h_{refi} = \frac{\lambda D_{refi}}{2H}. \tag{3}$$

For example, in case that the height H of the detection device is 0.5 m and λ is equal to 0.004 m: at the reference target distance $D_{ref1}$ of 70 m, if no valley is detected, it is determined that the object's height is less than a 30 cm; at the reference target distance $D_{ref2}$ of 45 m, if no valley is detected, it is determined that the object's height is less than 20 cm; at the reference target distance $D_{ref3}$ of 25 m, if no valley is detected, it is determined that the object's height is less than 10 cm.

A third embodiment can be used when long range data of measurement are not available. The detection device 1 can be a short-range detection device. However, the third embodiment can be implemented by a long-range detection device.

In the third embodiment, in the step S5, the detection device 1 detects a plurality of valleys $V_j$, $V_{j+1}$, $V_{j+2}$, . . . in the fluctuation of the estimated elevation angle θ over the target distance (range), typically a set of m successive valleys $V_j$, $V_{j+1}$, $V_{j+2}$, . . . . In the step S6, the detection device 1 estimates the height h of the target 2 from the respective target distances (ranges) $D_j$, $D_{j+1}$, $D_{j+2}$, of the plurality of detected valleys $V_j$, $V_{j+1}$, $V_{j+2}$, . . . . Different methods for estimating the target height h based on a plurality of detected valleys $V_j$, $V_{j+1}$, $V_{j+2}$, . . . can be used. In such methods, the values of the indexes of the detected valleys do not need to be known.

In a first method for estimating the target height h based on a plurality of detected valleys $V_j$, $V_{j+1}$, $V_j+2$, . . . , the detected valleys $V_j$, $V_{j+1}$, $V_j+2$, . . . are compared with a plurality of prestored models M1, M2, . . . of the elevation angle θ fluctuation over range (target distance). Each model M1, M2, . . . corresponds to a given target height h1, h2, . . . . The model Mx that best matches the positions (in other words: the target distances) of the detected valleys $V_j$, $V_{j+1}$, $V_j+2$, . . . , is selected. The selection of the model Mx that best matches the detected valleys can be performed using a least square (LS) based method, or an iterative least square based method, or a filtering method using for example Kalman filter. An estimation of the height h of the target 2 is derived from the target height hx corresponding to the selected model Mx. The height h of the target 2 can be considered as equal or substantially equal to the target height hx of the selected model Mx. Optionally, a similarity score between the detected valleys $V_j$, $V_{j+1}$, $V_{j+2}$, . . . and the selected model Mx can be calculated. The similarity score may be used to determine a level of accuracy of the estimation of the target height h or to improve the accuracy of the estimation.

In a second method for estimating the target height h based on a plurality of detected valleys $V_j$, $V_{j+1}$, $V_{j+2}$, . . . , the target distances (in other words: range positions, or positions) of the detected valleys $V_j$, $V_{j+1}$, $V_{j+2}$, . . . are transmitted to a machine learning module, as input data. For example, a feature vector containing the range positions $D_j$, $V_{j+1}$, $D_{j+2}$, . . . of N detected valleys $V_j$, $V_{j+1}$, $V_{j+2}$, . . . (i.e., the target distances corresponding to the N detected valleys) is created and provided to the machine learning module as input. The indexes of the detected valleys do not need to be known. It is only necessary for the indexes of the successively detected valleys to be consecutive. The length N of the feature vector can be 2, 3 or more. For example, in case that N=3, the feature vector can be expressed as follows:

$$[(j+2)^{th}\_valley\_position, (j+1)^{th}\_valley\_position, j^{th}\_valley\_position] = [D_{j+2}, D_{j+1}, D_j] \tag{4}$$

Additionally or alternatively, the fluctuation of the estimated physical quantity over the target distance is provided as input to the machine learning module.

In the step S6, the machine learning module produces an estimation of the target height h as an output.

In a training phase, the machine learning module can be trained with training data containing feature vectors (as input data) of length N and corresponding target heights (as reference data)

The detection device 1 has software means and hardware means to implement the method of estimating the height of a target, as previously described. The present disclosure also concerns a computer program including instructions to cause the detection device 1 to execute the steps of the method described, and a computer-readable medium having stored there on the computer program.

In the description of the embodiments, the information on the height h of the target 2 is derived from the fluctuation of the elevation angle θ over the range (i.e., over the target distance), the estimate of the elevation angle θ being derived from the phase difference Δϕ between the two receiver antenna elements 11A, 11B that is continuously measured (with a given sampling frequency). Alternatively, the information on the height h of the target 2 can be directly derived from the fluctuation of the elevation angle θ over the range D (i.e., over the target distance D).

The physical quantity fluctuation (e.g., the fluctuation of the estimated elevation angle or the fluctuation of the phase difference) derived from the phase difference measurements could be determined as a function depending on the reciprocal target distance 1/D (or "reciprocal range"), instead of the target distance D.

The present method of determining information on the target height based on the measured phase difference between the two receiver elements 11A, 11B could be used in combination with a method of determining information on the target height based on the measured intensity or amplitude of the wave signals received by one or the two receiver elements 11A, 11B.

The detection device is not limited to a radar device. It may be any type of detection device having at least one transmitter element for transmitting wave signals and at least two vertically aligned receiver elements for receiving wave signals, causing a phase difference between the reflected wave signals received by the at least two receiver elements.

What is claimed is:

1. A method comprising:
   transmitting, at a transmitter element of a detection device, a wave signal that is reflected by a target above a reflecting surface;
   receiving, at each of two receiver elements of the detection device that are vertically aligned with one another, the wave signal reflected by the target, the wave signal propagating via multiple paths caused by the reflecting surface;
   while a target distance between the detection device and the target varies over time, measuring a phase difference between the reflected wave signals received by the two receiver elements;
   determining, from the measured phase difference, a physical quantity fluctuation in relation to the target distance; and
   deriving information on a height of the target from the physical quantity fluctuation.

2. The method according to claim 1, wherein:
   said physical quantity fluctuation is a fluctuation of an estimated elevation angle in relation to the target distance;
   an elevation angle being formed between a horizontal plane including the detection device and a line going from the detection device to the target; and
   said fluctuation of the estimated elevation angle is determined from the measured phase difference and according to a calculation relationship between the measured phase difference and a spacing between the two receiver elements.

3. The method according to claim 1, further including searching at least one valley in the physical quantity fluctuation, wherein the information on the height of the target is determined from a result of the searching.

4. The method according to claim 3, further comprising, when no valley is found in the physical quantity fluctuation while the target distance decreases, determining that the height of the target is less than one or more reference heights.

5. The method according to claim 3, further comprising, when a first valley is detected in the physical quantity fluctuation when the target distance decreases from a long-range target distance, calculating a first value for the height of the target from a target distance of the first valley according to a calculation relationship between the target distance of the first valley and the height of the target.

6. The method according to claim 5, further comprising, when a second valley is detected in the physical quantity fluctuation when the target distance continues decreasing:
   calculating a second value for the height of the target again from the target distance of the second valley according to a calculation relationship between the target distance of the second valley and the height of the target; and
   comparing the calculated first and second values for the height of the target to check for consistency.

7. The method according to claim 3, further comprising:
   detecting a plurality of valleys in the physical quantity fluctuation; and
   estimating the height of the target from respective target distances of the plurality of detected valleys.

8. The method according to claim 7, further comprising:
   comparing the plurality of detected valleys with a plurality of prestored models of the physical quantity fluctuation, each model corresponding to a given target height; and
   selecting a model that best matches the plurality of detected valleys to estimate the height of the target.

9. The method according to claim 1, wherein at least one of the target distances of the plurality of detected valleys or the physical quantity fluctuation in relation to the target distance is transmitted to a machine learning module, as input data, and the height of the target is received from the machine learning module.

10. A detection device comprising:
    a transmitter element configured to transmit wave signals;
    two vertically aligned receiver elements configured to receive wave signals, the two receiver elements separated by a given spacing; and
    a processor configured to:
      cause the transmitter element to transmit a wave signal that is reflected by a target above a reflecting surface;
      receive, via the two receiver elements, the wave signal reflected by the target, the wave signal propagating via multiple paths caused by the reflecting surface;
      while a target distance between the detection device and the target varies over time, measure a phase difference between the reflected wave signals received by the two receiver elements;
      determine, from the measured phase difference, a physical quantity fluctuation in relation to the target distance; and derive information on a height of the target from the physical quantity fluctuation.

11. The detection device of claim 10, wherein said physical quantity fluctuation is a fluctuation of an estimated elevation angle in relation to the target distance, an elevation angle being formed between a horizontal plane including the detection device and a line going from the detection device to the target, and said fluctuation of the estimated elevation angle is determined from the measured phase difference and according to a calculation relationship between the measured phase difference and the given spacing between the two receiver elements.

12. The detection device of claim 10, wherein the processor is further configured to search at least one valley in the physical quantity fluctuation, wherein the information on the height of the target is determined from a result of the search.

13. The detection device of claim 12, wherein the processor further configured to, when no valley is found in the physical quantity fluctuation while the target distance decreases, determine that the height of the target is less than one or more reference heights.

14. The detection device of claim 12, wherein the processor is further configured to, when a first valley is detected in the physical quantity fluctuation when the target distance decreases from a long-range target distance, calculate a first value for the height of the target from a target distance of the first valley according to a calculation relationship between the target distance of the first valley and the height of the target.

15. The detection device of claim 14, wherein the processor is further configured to, when a second valley is detected in the physical quantity fluctuation when the target distance continues decreasing:
  calculate a second value for the height of the target again from the target distance of the second valley according to a calculation relationship between the target distance of the second valley and the height of the target; and
  compare the calculated first and second values for the height of the target to check for consistency.

16. The detection device of claim 12, wherein the processor is further configured to:
  detect a plurality of valleys in the physical quantity fluctuation; and
  estimate the height of the target from respective target distances of the plurality of detected valleys.

17. The detection device of claim 16, wherein:
  the plurality of detected valleys are compared with a plurality of prestored models of the physical quantity fluctuation;
  each model corresponds to a given target height; and
  the model that best matches the plurality of detected valleys is selected to estimate the height of the target.

18. The detection device of claim 12, wherein at least one of the target distances of the plurality of detected valleys or the physical quantity fluctuation in relation to the target distance is transmitted to a machine learning module, as input data, and the height of the target is received from the machine learning module.

19. A non-transitory computer-readable medium for storing instructions that, when executed by a processor, perform operations including:
  transmitting, via a transmitter element of a detection device, a wave signal that is reflected by a target above a reflecting surface;
  receiving, at each of two receiver elements of the detection device that are vertically aligned with one another, the wave signal reflected by the target, the wave signal propagating via multiple paths caused by the reflecting surface;
  while a target distance between the detection device and the target varies over time, measuring a phase difference between the reflected wave signals received by the two receiver elements;
  determining, from the measured phase difference, a physical quantity fluctuation in relation to the target distance; and
  deriving information on a height of the target from the physical quantity fluctuation.

20. The non-transitory computer-readable medium of claim 19, wherein:
  said physical quantity fluctuation is a fluctuation of an estimated elevation angle in relation to the target distance;
  an elevation angle being formed between a horizontal plane including the detection device and a line going from the detection device to the target; and
  said fluctuation of the estimated elevation angle is determined from the measured phase difference and according to a calculation relationship between the measured phase difference and a spacing between the two receiver elements.

* * * * *